United States Patent
Alderman et al.

[19]

[11] Patent Number: 5,872,646
[45] Date of Patent: Feb. 16, 1999

[54] PHOTOELECTRIC DETECTOR WITH CODED PULSE OUTPUT

[76] Inventors: Richard A. Alderman, 106 Park Crest Dr.; David A. Klein, 922 S. Chicago Ave., both of Freeport, Ill. 61032

[21] Appl. No.: 811,657

[22] Filed: Mar. 5, 1997

[51] Int. Cl.⁶ .................................................. H04B 10/00
[52] U.S. Cl. ........................................... 359/169; 359/170
[58] Field of Search ............................ 359/152, 169–170; 250/215; 375/219, 224, 239, 260, 342

[56] References Cited

U.S. PATENT DOCUMENTS

| | | | |
|---|---|---|---|
| 5,151,591 | 9/1992 | Johnson et al. | 250/214 B |
| 5,331,150 | 7/1994 | Marsh | 250/223 B |
| 5,434,668 | 7/1995 | Wootton et al. | 359/170 |
| 5,496,996 | 3/1996 | Barnes et al. | 250/222.1 |

OTHER PUBLICATIONS

Application Note #579. National Semiconductor–Microwine./Plus™–Serial Interface for COP800 Family.

*Primary Examiner*—Kinfe-Michael Negash
*Attorney, Agent, or Firm*—William D. Lanyi; Roland W. Norris

[57] ABSTRACT

A detector, such as a photodetector, is provided with a serial output and serial input capability so that a first plurality of pulses can be transmitted from the detector in a first preselected direction. The first plurality of pulses represent a coded pattern. When pulses are received by the receiver portion of the detector, the received second plurality of pulses is compared to the first plurality of pulses to determine whether or not the two pluralities of pulses represent precisely matched coded patterns. The use of coded patterns that comprise a plurality of bits, or pulses, significantly decreases the chance of a mis-identification of a received pulse as being representative of a reflected transmitted pulse.

14 Claims, 8 Drawing Sheets

PHOTOELECTRIC DETECTOR WITH CODED PULSE OUTPUT

BACKGROUND OF THE INVENTION

1. Field of the Invention

The present invention is generally related to an energy pulse transmitter which provides a pulse energy level output in a coded pattern and compares a received input with the coded pattern to determine if a match occurs and, more particularly, to a photoelectric sensor that provides an output of a plurality of coded pulses and receives a reflected light pattern prior to comparing the received reflected light pattern with the transmitted coded pattern.

2. Description of the Prior Art

Many different types of photoelectric detectors are known to those skilled in the art. Photoelectric detectors can be applied in several different ways. One application is referred to by those skilled in the art as a retroreflective configuration and uses a stationary reflector to reflect a light pattern back toward its source. If an object passes through a predefined detection zone, the light beam is interrupted and the presence of the object is determined by the lack of a return signal. Another type of application is called a diffuse system in which no reflector is used. Instead, the light is reflected from a reflective object to be detected and the reflected light received by the photodetector indicates the presence of the object within the predetermined detection zone. Another type of photodetector system employs a light transmitter and a remote light receiver. This is referred to by those skilled in the art as a thru-scan system. If an object breaks the light beam, it is not received by the receiver. This lack of a received signal indicates that an object is within the detection zone which is between the transmitter and the receiver.

In typical photodetector systems, a pulsed light beam is transmitted at a preselected and constant frequency. After each light pulse is transmitted, a receiver is armed for a preselected period of time, referred to by those skilled in the art as a time window. If a return pulse is received within the window, it is considered to be a valid pulse.

Photodetectors known to those skilled in the art exhibit certain problems in particular applications. Background light from external sources can cause false triggering by a photodetector. In addition, if two photodetectors are placed in close proximity to each other, the transmitted light from one detector can be inadvertently received by the other detector and false triggering will occur as a result of this arrangement.

U.S. Pat. No. 5,151,591, which issued to Johnson et al on Sep. 29, 1992, discloses an asynchronous signal interrogation circuit for a detection apparatus. The photodetector circuit is provided to interrogate incoming signals and determine whether the frequency of those incoming signal pulses is acceptable. The circuitry of the device permits a series of incoming pulses to be interrogated in order to determine whether the frequency of those pulses is acceptable and can be assumed with confidence to be emanating from an appropriate light source. Upon the receipt of a first input signal pulse, a time window is created by the circuit in order to define a period of time during which a subsequent input signal pulse is to be expected. Other than during the duration of the time window, the circuit will not accept an input signal pulse and will not count that pulse as having been received. Each properly received pulse creates a subsequent time window until a predetermine number of consecutive pulses is received during their time windows. When that predetermined number is received, a signal is provided. In a particularly preferred embodiment of this detector, the signal that the predetermined number of consecutive pulses have been received is used to lower the threshold voltage of a comparator for the purpose of facilitating receipt of subsequent signals once the appropriateness of the incoming stream of pulses is determined.

U.S. Pat. No. 5,331,150, which issued to Marsh on Jul. 19, 1994, discloses a photoelectric sensor with variable light pulse frequency. The photo sensor is provided with a control circuit that is capable of varying the frequency of light pulses which energize a light source of the sensor. When four consecutive light pulses result in an identical status of a light sensitive component, the frequency of light pulses is slowed in order to conserve energy. However, when a change in state is recognized by the circuitry of the detector, the frequency of light pulses is increased in order to more rapidly determine whether or not a change of status has actually occurred. This permits the photoelectric sensor to conserve energy while also being able to rapidly determine whether or not the light path of the photoelectric sensor has changed state from obstructed to unobstructed or, conversely, from unobstructed to obstructed.

U.S. Pat. No. 5,496,996, which issued to Barnes et al on Mar. 5, 1996, describes a photoelectric device with the capability to change threshold levels in response to changing light intensities. The photoelectric sensor is provided with the capability of calculating a threshold magnitude based on a maximum light intensity received by a light sensitive device. The maximum value of the light intensity is determined during a preselected period of time when no object is blocking the path of the light beam. A second threshold magnitude is used to assist the detector in determining the leading edge and trailing edge of a transparent object. The values of the first and second threshold magnitudes are updated dynamically as bottles pass through the path of the light beam. This permits the photoelectric sensor to react to changes in light intensity without providing false signals of bottles within the light path or missing bottles that are within the light path.

As described immediately above, several different methods have been applied in attempts to refine the methods used to detect an object within the detection zone of a photodetector. These methods typically are directed in an effort to improve the accuracy and reliability of detection for the photodetector. Some of these concepts are directed to overcoming difficulties that can be caused by the presence of background light from external sources and light interference from other photodetectors. It would therefore be significantly beneficial if a photodetector could be developed that is virtually immune to the interference from background light and other photodetectors.

SUMMARY OF THE INVENTION

The present invention comprises an energy pulse transmitter for transmitting a first plurality of pulses in a first preselected direction. The first plurality of pulses comprises a coded pattern of high and low pulses. In a particularly preferred embodiment of the present invention, the energy of the pulses is light energy and the coded pattern of high and low pulses comprises high pulses which represent the presence of light and low pulses which represent the absence of light. However, it should be clearly understood that alternative forms of energy can be transmitted by the present invention. For example, sound pulses or electromagnetic pulses can also be used within the scope of the present invention.

The detector of the present invention also comprises a receiver for receiving a second plurality of pulses from a second preselected direction. A comparator is provided for comparing the first plurality of pulses to the second plurality of pulses. The detector also has an output signal transmitter for providing an output signal to acknowledge when the first and second plurality of pulses are equal and the when second plurality of pulses comprises the coded pattern of the first plurality of pulses. The output signal provided by the output signal transmitter can be either logically high or logically low when the first and second pluralities of pulses comprise the same coded pattern. For example, in a retroreflective application of the detector, a perfect match between the first and second pluralities of pulses, wherein they both contain the same coded pattern, would indicate the absence of an object in the detection zone because the beam of light is not blocked or interfered with in any way. However, in a diffuse application, a perfect match of coded patterns in the first and second pluralities of pulses would indicate the presence of an object in the detection zone. Therefore, it should be clearly understood that the output signal from the present invention can be either logically high or logically low when indicating a match of the two coded patterns of the first and second pluralities of pulses.

In certain embodiments of the present invention, the first plurality of pulses comprises a series of light pulses. The high pulses being represented by the presence of light and the low pulses being represented by the absence of light.

In a particularly preferred embodiment of the present invention, the first plurality of pulses can comprise eight individual pulses, wherein at least one of the eight pulses is a high pulse. In other words, the transmission of the first plurality of pulses includes the serial transmission of eight pulses. Each of the eight pulses can be represented by the presence of light or the absence of light. At lease one of the eight pulses should be represented by the presence of light. However, the eight pulses can be selected to represent any one of 255 patterns in which at least one of the plurality of pulses is a high signal represented by the presence of light. In a preferred embodiment of the present invention, a microprocessor is used to perform the functions of the energy pulse transmitter and the comparator.

BRIEF DESCRIPTION OF THE DRAWINGS

The present invention will be more fully and completely understood from a reading of the Description of the Preferred Embodiment in conjunction with the drawings, in which.

DESCRIPTION OF THE PREFERRED EMBODIMENT

Throughout the Description of the Preferred Embodiment, like components will be identified by like reference numerals.

Figure 1A:
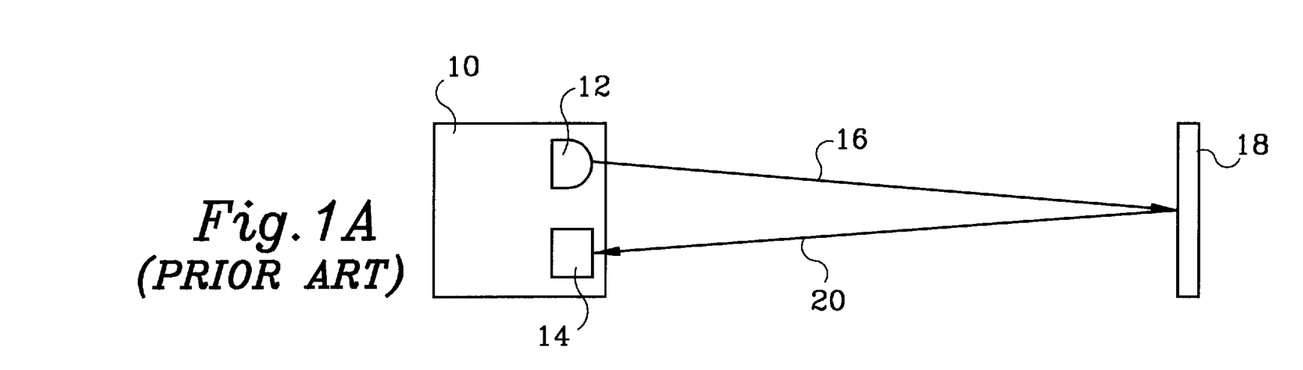
FIGS. 1A and 1B show two situations relating to a retroreflective application of a photodetector.
Figure 1B:
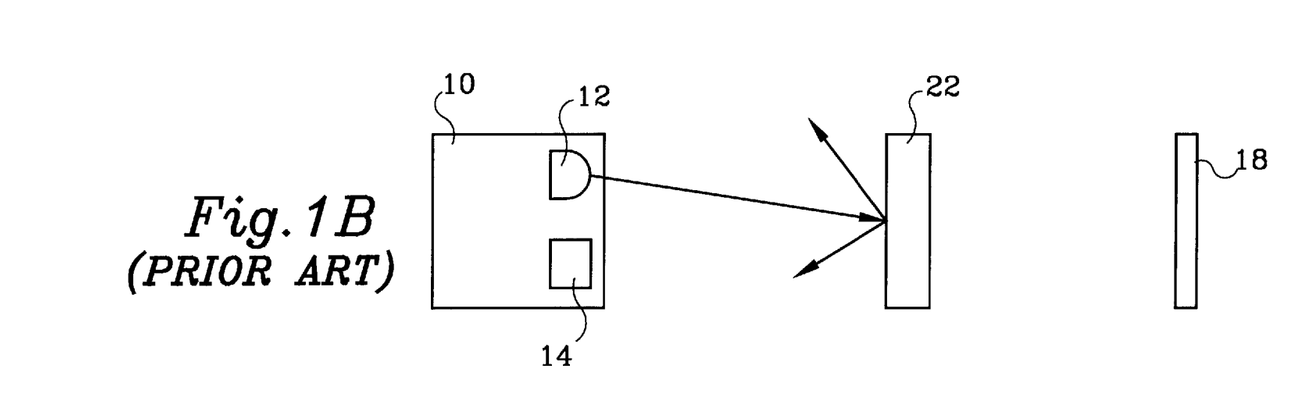

FIGS. 1A and 1B show the typical configuration of a retroreflective photodetector application. The photodetector 10 comprises a light transmitter 12 and a light receiver 14. Although it is well known that the components of the photodetector 10 require certain amplification and associated circuitry, that circuitry is not illustrated in the Figures because it is well known to those skilled in the art. The light transmitter 12 provides a beam of light 16 in a first preselected direction toward a reflector 18. The surface of the reflector 18 is configured to reflect the light back in a second preselected direction toward the photodetector 10. The return light beam 20 is received by the light receiver 14. The return of the light beam, as illustrated in FIG. 1A, indicates that no object is within the detection zone between the photodetector 10 and the reflector 18.

In FIG. 1B, the retroreflective application is shown with an object 22 in the detection zone between the photodetector 10 and the reflector 18. The light transmitter 12 provides the beam of light 16, as in the above example relating to FIG. 1A, but the object 22 blocks the beam and prevents it from reaching the reflector 18. This is represented by the scattered light arrows emanating from the object 22 as a result of the light beam 16 impinging on the object. As a result, the light receiver 14 will not receive the light beam 20 as described above in conjunction with FIG. 1A. The situation shown in FIG. 1B would be accompanied by an output signal from the photodetector 10 indicating that the object 22 is within the detection zone. Both of the applications shown in FIGS. 1A and 1B are well known to those skilled in the art.

Figure 2A:
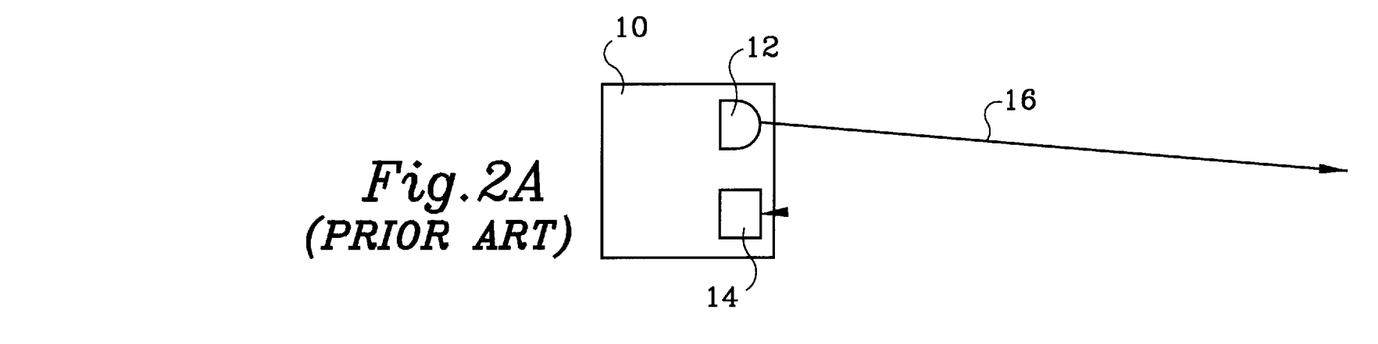
FIGS. 2A and 2B show two representations of a diffuse application of a photodetector.

FIG. 2A shows a diffuse application of a photodetector 10. No reflector 18, as discussed above in conjunction with Figures 1A and 1B, is used. If no object is within the detection zone of the photodetector 10, the light beam 16 is not reflected back toward the light receiver 14 of the photodetector 10.

Figure 2B:
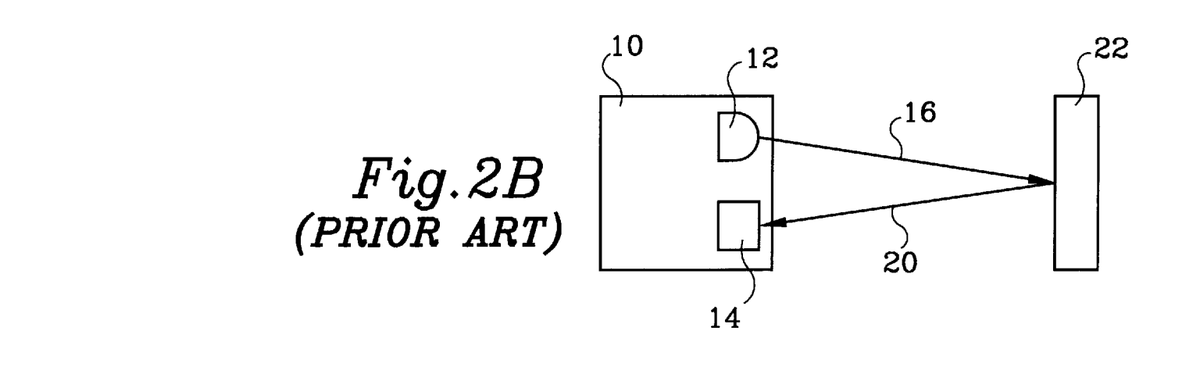

FIG. 2B shows the diffuse application of FIG. 2A, but with an object 22 within the detection zone of the photodetector 10. The light beam 16 strikes the object 22 and is reflected back toward the light receiver 14. The receipt of the return light signal 20 indicates the presence of an object 22 within the detection zone.

Figure 2C:
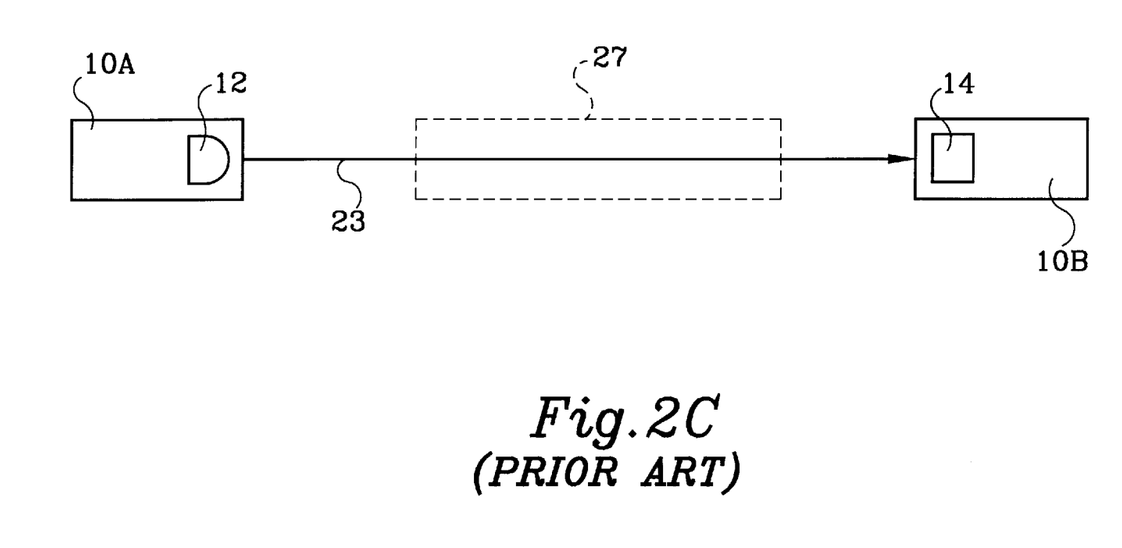
FIG. 2C illustrates a representation of a thru-scan application of a photo detector system.

FIG. 2C shows an application of a photoelectric detector that is referred to by those skilled in the art as a thru-scan application. The light transmitter 12 is disposed in a first housing 10A and the light receiver 14 is disposed in a second housing 10B. The first and second housings are arranged so that light transmitted from the light transmitter 12 can be received by the light receiver 14. This defines a line of sight 23 which passes through a preselected detection zone 27. A typical application of a thru-scan arrangement would place the first housing 10A on one side of a conveyor system and housing 10B on the other side of the system so that the light beam passes along the direction indicated by arrow 23 and is broken when an object moving on the conveyor system passes through the detection zone 27.

FIGS. 1A, 1B, 2A, 2B and 2C represent known applications of photodetectors. In the known applications, individual pulses of light are transmitted at a preselected constant frequency, or a changing frequency, and those pulses are received by a light receiver within the photodetector housing. Each individual pulse is either received or not received and, based on that result, the presence or absence of an object is determined. In a typical application of a photodetector, a preselected number of light pulses must be properly received in sequence in order to decide whether or not the received pulses are actually reflections of transmitted pulses. However, background light or light from other photodetectors could possibly cause false triggering if the frequency of the external light matches the frequency of the light pulses transmitted by the photodetector. Electrical noise can also adversely affect the operation of the photodetector.

Figure 3:
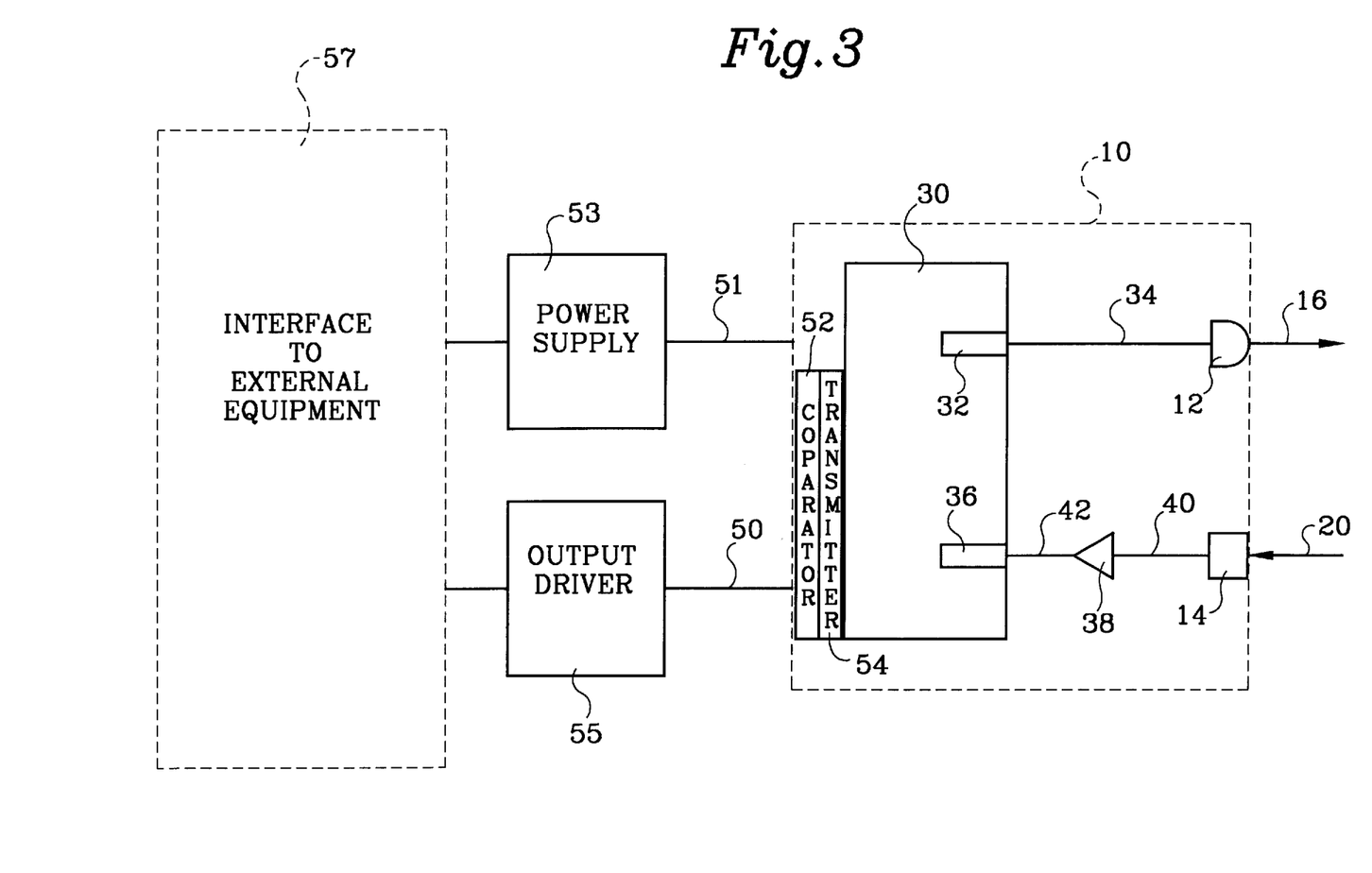
FIG. 3 is a schematic representation of the present invention.

FIG. 3 is a schematic representation of a photodetector made in accordance with the principles of the present invention. The photodetector 10, like those described above in conjunction with the prior art, comprises a light transmitter 12 and a light receiver 14. In a preferred embodiment of the present invention, the photodetector 10 comprises a microprocessor 30 which has a serial output port and a serial input port. The serial output port 32 is a feature available in various types of microprocessors 30, such as that which is identified by number COP822 and is available in commercial quantities from National Semiconductor. The function of the serial output port 32 is to convert a parallel multibit pattern into a serial pattern. In a photodetector 10 comprising this type of system, the serial output 32 is connected, by line 34, to the light transmitter 12. The result of this is the output of a light pulse for every logically high bit received on line 34 from the serial output 32 of the microprocessor 30. It should be understood that, in typical applications, output circuitry would be included between the serial output 32 and the light transmitter 12 in order to appropriately amplify the signal for the purpose of energizing the light transmitter 12, which can be an LED.

With continued reference to FIG. 3, the microprocessor 30 is also provided with a serial input port 36 that receives a serial pattern of bits and converts it to logical ones and zeros in a memory location of the microprocessor 30. When the light receiver 14 receives a light pulse, that signal is provided to an amplifier 38, on line 40, and the amplified signal is provided on line 42 to the serial input port 36. Therefore, the arrangement shown in FIG. 3 allows a first plurality of pulses to be transmitted in a first preselected direction, represented by arrow 16. It also provides a receiver, in the form of serial input port 36, to receive a second plurality of pulses from a second preselected direction, represented by arrow 20. It will be appreciated that if the present invention is used in a thru-scan mode, the first and second preselected direction will be the same. The microprocessor 30 can then act as a comparator 52 for comparing the first plurality of pulses to the second plurality of pulses. An output signal transmitter 54 therein can also provide an output signal on line 50 when the two coded patterns match perfectly. The photodetector 10 is connected to an interface circuit 57, a power supply 53 and an output receiver 55. Power is provided on line 51 and the output signal from the photodetector 10 is provided on line 50 to the output receiver 55.

Figure 4:
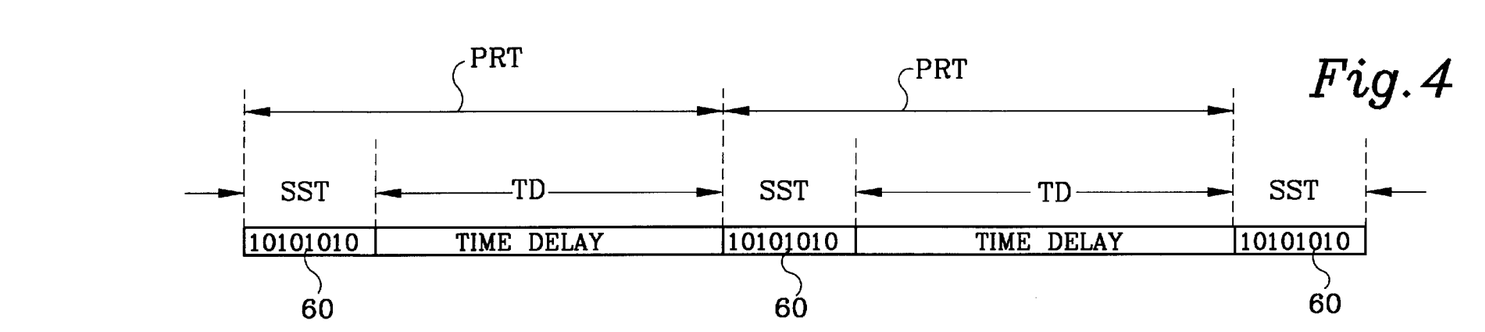
FIG. 4 represents a time-based pulse stream transmitted by the present invention.

With reference to FIGS. 3 and 4, the output from the serial output port 32 is represented in FIG. 4. For the purpose of describing a particularly preferred embodiment of the present invention, the first plurality of pulses will be represented by a coded pattern of eight bits although other numbers of bits can also be used. This pattern is identified in FIG. 4 by reference numeral 60 on a time line. In one particular embodiment of the present invention, the eight bits of the coded pattern 60 represents a serial shift time, or SST, of 16 microseconds. After the output of the coded pattern 60, a time delay of approximately 234 microseconds occurs during which time no light output pulses are transmitted by the photodetector. If a change of condition is detected, additional output patterns will be transmitted during the time delay period TD, but if a change of state does not occur, the normal sequence of occurrences will be as represented in FIG. 4. Following the time delay TD, and at the end of a pulse repetition time PRT of 250 microseconds, the coded pattern 60 is again provided by the serial output port 32 of the microprocessor 30 as described above in conjunction with FIG. 3. The serial shift time SST of 16 microseconds is again used to transmit the eight bits of the coded pattern 60 and this serial shift time is followed by another time delay of 234 microseconds. As represented in FIG. 4, this sequence of output and delays will occur indefinitely as long as no change of state is detected. It should be understood that a change of state can comprise the changing of a pattern matching condition to a pattern non-matching condition or, alternatively, from a pattern non-matching condition to a pattern matching condition. However, as long as the change of state does not occur, the sequence represented in FIG. 4 will continue indefinitely.

Figures 5, 6:
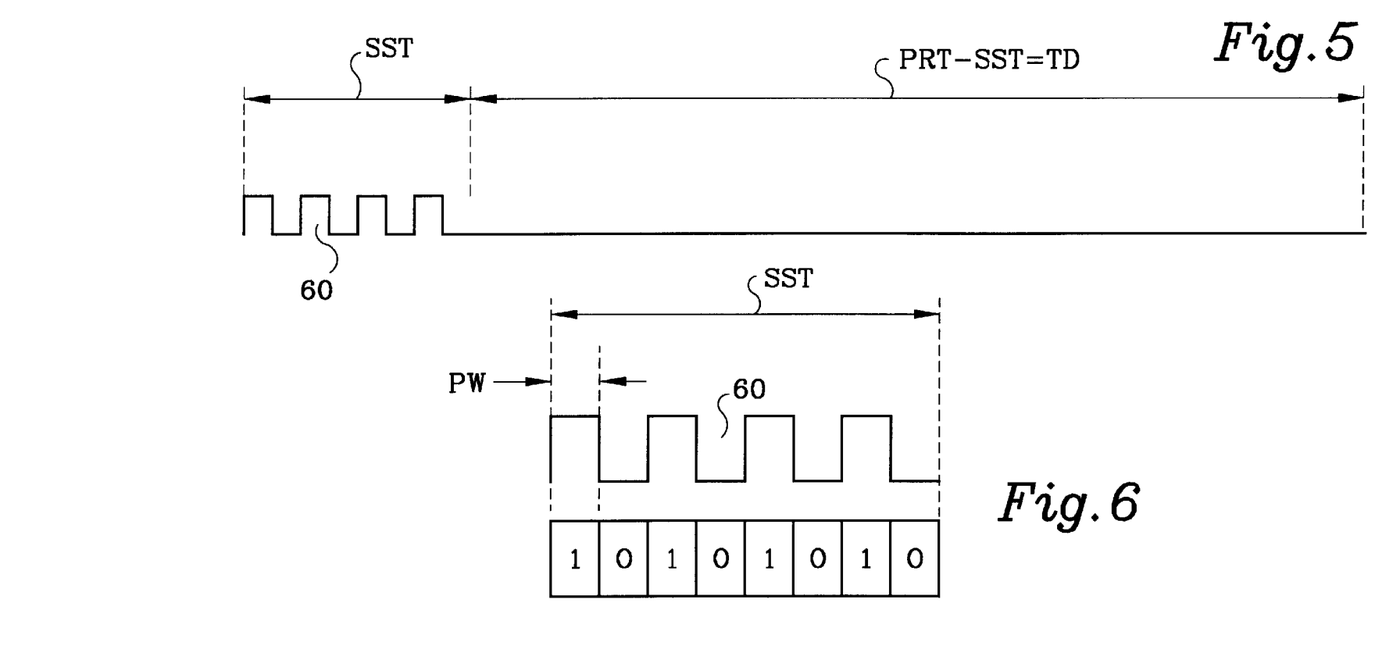
FIG. 5 is an expanded illustration of one series from FIG. 4.
FIG. 6 is an expanded illustration of a single coded pattern.

FIG. 5 is an expanded view of one pulse repetition time, or PRT, such as those illustrated in FIG. 4. In FIG. 5, the eight bits of coded pattern are represented as high and low pulses rather than the binary representation of the coded pattern 60 in FIG. 4. However, the pulse representation in FIG. 5 is identical to the hexadecimal representation of "AA" in FIG. 4. The time delay TD following the pulsed output of the coded pattern 60 is equal to the difference between the total pulse repetition time PRT of 250 microseconds and the serial shift time SST of 16 microseconds required to transmit the eight pulses which require two microseconds per pulse.

The relationship between the binary representation of the coded pattern 60 in FIG. 4 and the pulse representation of the coded pattern 60 in FIG. 5 is further illustrated in FIG. 6. Each pulse of the coded pattern 60 has a pulse width PW of two microseconds. However, other embodiments may utilize different pulse widths. This is true whether the pulse is a high pulse or a low pulse. Directly below the pulse representation in FIG. 6, the binary representation is illustrated. The use of eight bits for the coded pattern, as in a preferred embodiment of the present invention, provides a very high probability that a matched pattern truly represents the receipt of a light pattern transmitted by the photodetector. The probability that such an eight bit pattern was caused by background lighting or another photodetector is extremely small. The use of an eight bit pattern provides 255 combinations of high and low pulses if at least one high pulse is required in the coded pattern 60. The number and positions of the eight pulses in the coded pattern 60 can be selected to distinguish each photodetector from other photodectors. In effect, it can serve as an individual identifying marker that distinguishes the photodetector from other photodetectors. As a result, the receipt of a matching coded pattern by the light receiver 14 provides a very high likelihood that the received light signal is a reflected version of the transmitted light signal. Other considerations may be used to determine the pattern of high and low pulses in the coded pattern. For example, too many high pulses may consume excessive energy and, in many applications, this can be undesirable. Furthermore, in certain application the receipt of too many high pulses in consecutive sequence may adversely affect the operation of the related circuitry. These matters must be considered in every application of the present invention in order to determine the most advantageous coded pattern to use. In some applications, a single high pulse accompanied by seven low pulses is used. However, the position of the single high pulse, in conjunction with seven low pulses, provides a sufficient level of uniqueness to take advantage of the basic concept of the present invention.

With reference to FIGS. 4, 5 and 6, it should be understood that the photodetector 10 made in accordance with the present invention continues to provide the serial output of the coded pattern 60 followed by the time delay TD, as represented in FIG. 5, as long as the status of the sensor does not change. This repeated cycling of the procedure is shown in FIG. 4. For example, if the photodetector has determined that a match exists between the coded pattern transmitted and the pattern received, its status is determined to be one where the patterns are identical. As long as subsequent received light patterns are identical to the transmitted coded pattern, the photodetector will operate in the manner represented by FIG. 4. In other words, it will continue to output the coded pattern 60 and then execute a time delay TD until the total pulse repetition time PRT elapses. This is then followed with another serial output of the coded pattern 60 and another time delay as illustrated. This is also true if the coded patterns do not match. Once the photodetector determines that a non-match exists between the received pattern and the transmitted pattern, it will continue to perform the sequence shown in FIG. 4 until a match is detected. The detection of this match between the received pattern and the transmitted coded pattern would represent a change in status from the non-match condition. The operation of the photodetector in situations where a status change occurs will be described in greater detail below.

Figure 7:
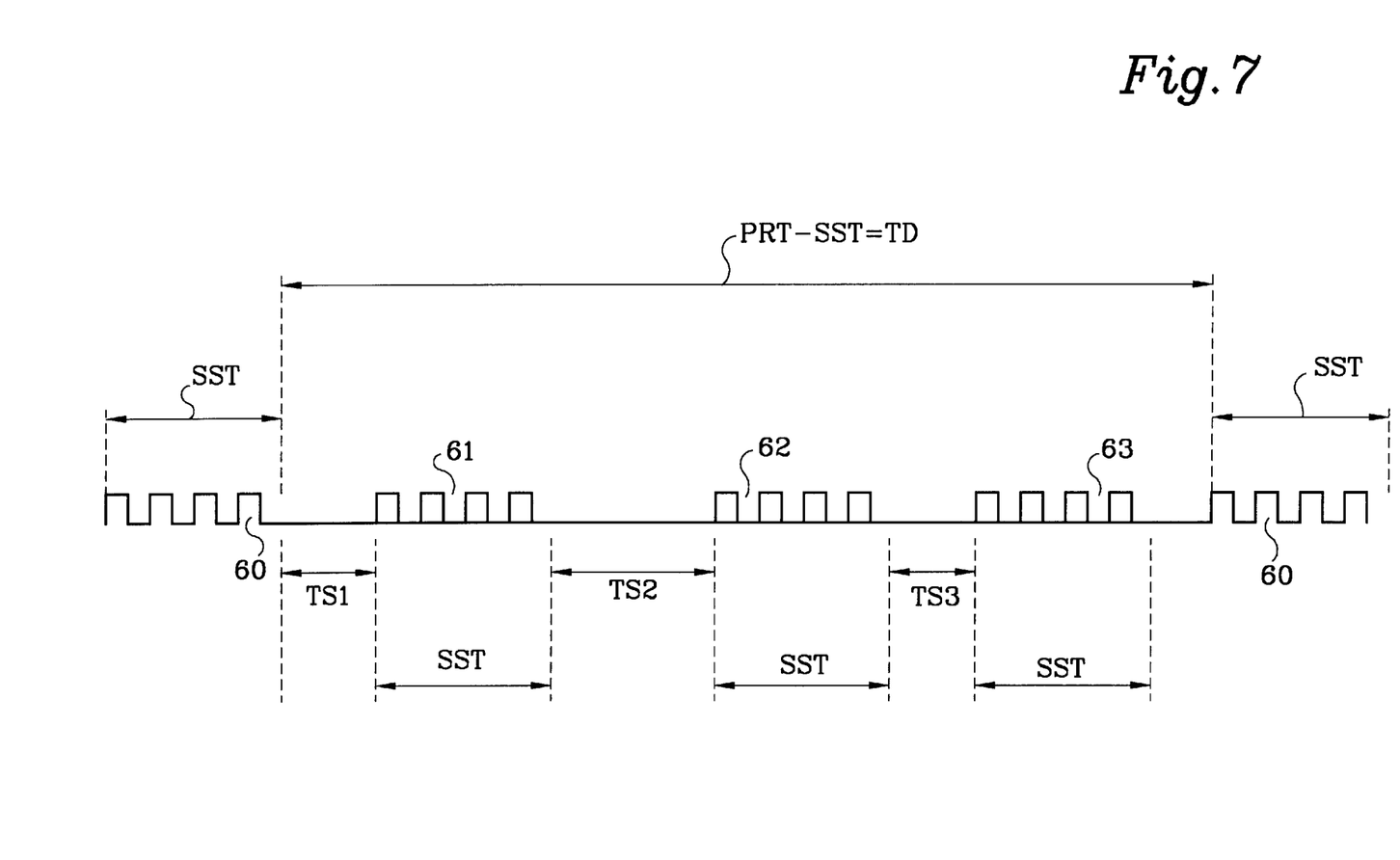
FIG. 7 illustrates the response of the present invention to a detected change of status of the photodetector.

FIG. 7 illustrates the behavior of the photodetector in cases where a change in status occurs. In FIG. 7, the first coded pattern 60 is identical in both form and purpose to the coded pattern 60 in FIGS. 4, 5 and 6. However, after the transmission of the last bit of the coded pattern 60 in FIG. 7, a change in condition is hypothetically detected. As described in detail above, this changing condition could represent a change from a non-matching condition to a matching condition or, alternatively, from a matching condition to a non-matching condition. Regardless of the nature of this change of status, the present invention delays for a predetermined period of time identified as TS1 in FIG. 7. For example, the time delay of TS1 can be 32 microseconds. This first delay is immediately followed by a subsequent transmission of the coded pattern. This subsequent transmission is identified by reference numeral 61. Then, a second time delay TS2 is executed. It is preferable that the second time not be equal the first time delay. After the second time delay TS2, another coded pattern 62 is transmitted from the serial output port 32 of the microprocessor 30. It should be understood that the coded pattern identified by reference numeral 62 is equal to the coded pattern identified by reference numerals 60 and 61. After the coded pattern 62 is transmitted from the serial output port 32 of microprocessor 30, a third time delay TS3 is executed. After time delay TS3 is complete, another coded pattern 63 is transmitted from the photodetector. As described above, the four coded patterns, 60–63, are identical in their respective bit patterns in this example. However, the four coded patterns, 60–63, could be different from each other in alternative embodiments of the present invention.

With continued reference to FIG. 7, it can be seen that a perceived change in status results in a total of four individual outputs of coded patterns, 60–63. The coded pattern 60 is the one that is normally transmitted and is part of the standard sequence shown in FIG. 4. The subsequent three transmissions of coded patterns, 61–63, are transmitted only in response to a detection of a status change following the output of coded pattern 60. It should also be noted that all three of the subsequent coded patterns, 61–63, are transmitted during the time delay portion TD of the standard repetitive cycle. The results of the four transmissions, 60–63, and their associated receipts of coded patterns are used to determine whether or not a true change of condition has occurred. Many different alternatives can be used to make this decision. For example, a very strict threshold can be applied where four consecutive matches are needed to determine that a matching condition exists. In other words, the receipt of the second plurality of pulses following coded pattern 60 must match, bit for bit, and the same must be true for the three subsequent patterns, 61–63. Other alternatives could include a three out of four matching threshold or any other preselected threshold. In addition, the requirements to change from a matching status to a non-matching status can be different than the requirements to change from a non-matching status to a matching status. Perhaps a change of status from non-matching to matching will require a four out of four situation, whereas a change in the opposite direction might only require a three out of four requirement. All of these options are within the scope of the present invention.

With reference to FIG. 3, a particularly preferred embodiment of the present invention utilizes a microprocessor 30 which is identified as type COP822 and is available in commercial quantities from the National Semiconductor Company. This type of device utilizes a MICROWIRE/PLUS™ serial interface. This type of serial interface is described in detail in application notes available from National Semiconductor and, in particular, in application note 579. The timing requirements of the serial interface are described in detail, along with the necessary information to implement this interface. During the output operation, the most significant bit is transmitted first and the least significant bit is transmitted last. At the serial input of the microprocessor, the least significant bit is received first and the most significant bit is received last. However, it should be well understood by those skilled in the art that these specific details are not limiting to the scope of the present invention. In addition, it should be understood that alternative microprocessors with alternative serial interfaces can also be used to implement the concepts of the present invention.

Figure 8A:
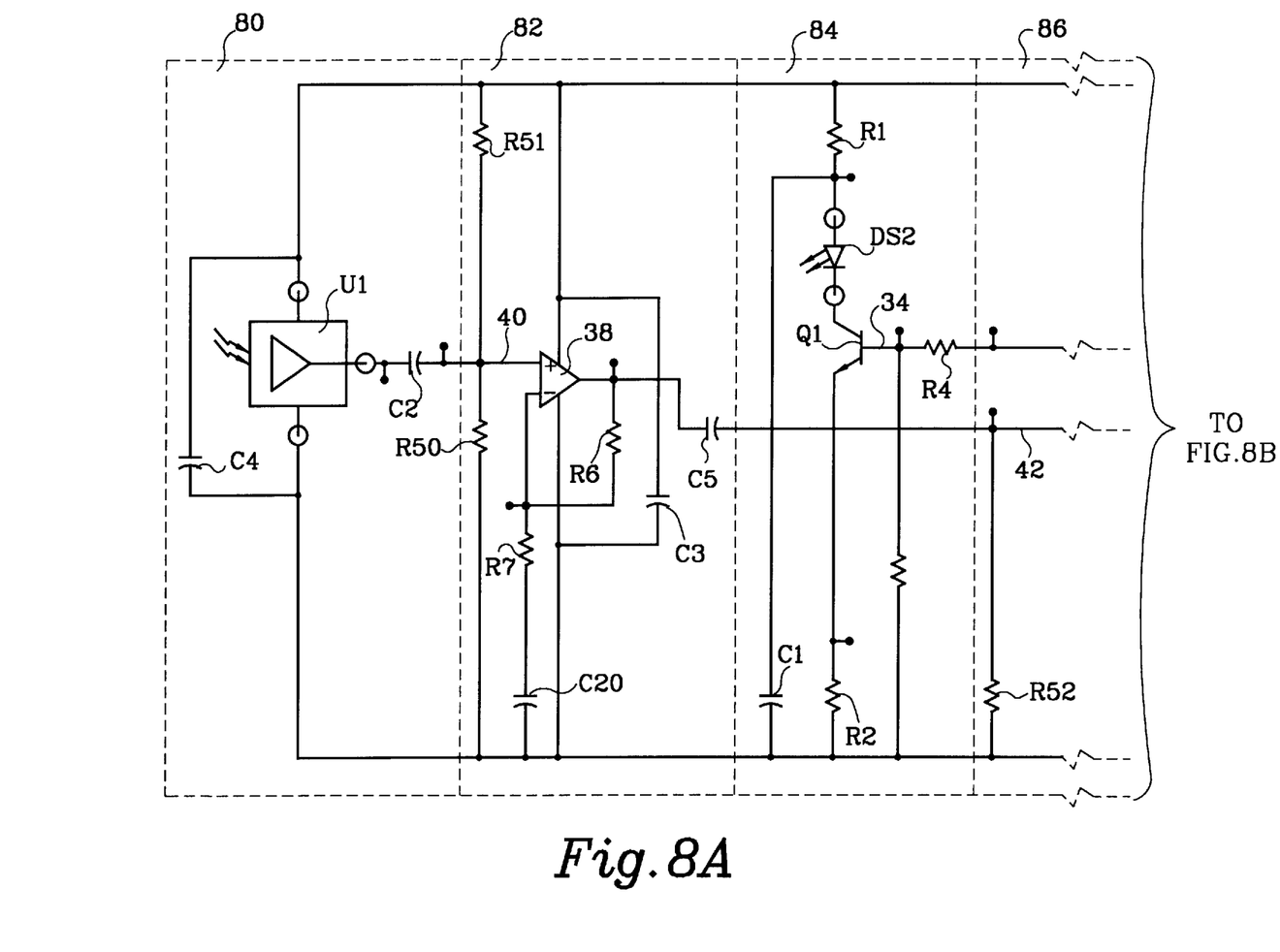
FIG. 8A–8B are a schematic circuit representation of one embodiment of the present invention.
Figure 8B:
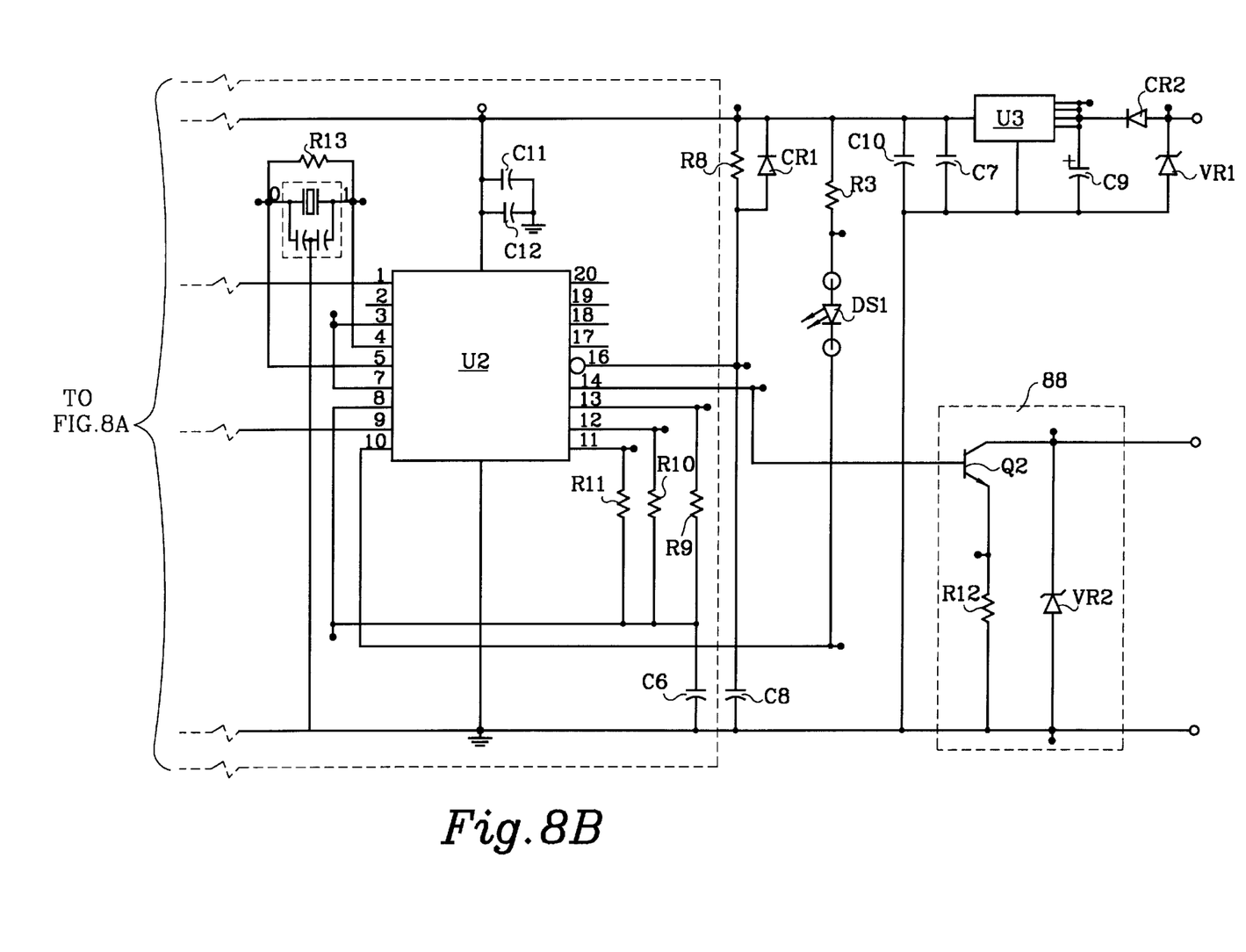

FIG. 8 shows a circuit that can be used to implement the concepts of the present invention. The specific size and specification of the components shown in FIG. 8 are identified in table I below.

TABLE I

| REFERENCE | TYPE OR SIZE |
|---|---|
| C1 | 10 microfarads |
| C2 | 1000 picofarads |
| C3 | .01 microfarads |
| C4 | .01 microfarads |
| C5 | 1000 picofarads |
| C6 | .01 microfarads |
| C7 | 10 microfarads |
| C8 | .047 microfarads |
| C9 | .22 microfarads |
| C10 | 1000 picofarads |
| C11 | 1000 picofarads |
| C12 | .01 microfarads |
| R1 | 120 ohms |
| R2 | 47 ohms |
| R3 | 1K-ohms |
| R4 | 2.2K ohms |

TABLE I-continued

| REFERENCE | TYPE OR SIZE |
|---|---|
| R51 | 330K-ohms |
| R6 | 270K ohms |
| R7 | 12K-ohms |
| R8 | 2.2M ohms |
| R9 | 15K ohms |
| R10 | 10K ohms |
| R11 | 1.5K ohms |
| R12 | 2 ohms |
| R13 | 2M-ohms |
| R52 | 220K ohms |
| Q1 | MMBT5088L |
| Q2 | MMBT5088L |
| DS1 | red LED |
| DS2 | infrared emitter |
| VR1 | 36 volts |
| VR2 | 36 volts |
| U2 | COPCJ822 |
| U3 | 5 volt regulator |

In FIG. 8, the dashed boxes represent the receiver circuitry 80, the signal conditioning circuitry 82, the emitter circuitry 84, the microcontroller and its related circuitry 86 and the output circuitry 88. Comparing FIGS. 3 and 4, the receiver 14 is analogous to the light sensitive component U1 in FIG. 8. The infrared emitter DS2 in FIG. 8 is analogous to the light transmitter 12 in FIG. 3. The microprocessor 30 is analogous to the microprocessor U2 in FIG. 8.

By utilizing a serial output of pulses that form a coded pattern, the present invention is able to provide an increased level of discrimination when the reflected light pulses are received by the photodetector. Rather than use single pulses that are compared in a purely binary manner, such as received or not received, the present invention uses a plurality of pulses to vastly increase the likelihood that a matched signal represents the actual receipt of a transmitted signal and not the result of background radiation or another photodetector signal. Although the present invention has been described in terms of an embodiment that relates direction to a photodetector, it should be understood that alternative forms of radiation can be used in conjunction with the present invention. In addition, it should be understood that the present invention can be used in conjunction with a detector system arranged in either the retroreflective, diffuse or thru-scan configurations. Although the present invention has been described to specifically and particularly disclose one embodiment of the present invention, it should be understood that many alternative embodiments are also within its scope.

The embodiments of the invention in which an exclusive property or right is claimed are defined as follows:

1. A object detector, comprising:
an energy pulse transmitter for transmitting a first plurality of pulses in a first preselected direction, said first plurality of pulses comprising a coded pattern of high and low pulses;
a receiver for receiving a second plurality of pulses from a second preselected direction;
a comparator for comparing said first plurality of pulses to said second plurality of pulses; and
an output signal transmitter for providing an output signal when said first and second pluralities of pulses are equal and said second plurality of pulses comprises said coded pattern.

2. The object detector of claim 1, wherein:
said first plurality of pulses comprises a series of light pulses, said high pulses being represented by the presence of light and said low pulses being represented by the absence of light.

3. The object detector of claim 1, wherein:
said first plurality of pulses comprises eight pulses, at least one of said eight pulses being a high pulse.

4. The object detector of claim 1, wherein:
said output signal is a logically high signal when said first and second pluralities of pulses comprise the same coded pattern.

5. The object detector of claim 1, wherein:
said output signal is a logically low signal when said first and second pluralities of pulses comprise the same coded pattern.

6. The object detector of claim 1, wherein:
a microprocessor comprises said energy pulse transmitter and said comparator.

7. A object detector, comprising:
an energy pulse transmitter for transmitting a first plurality of pulses in a first preselected direction, said first plurality of pulses comprising a coded pattern of high and low pulses, said first plurality of pulses comprising a series of light pulses, said high pulses being represented by the presence of light and said low pulses being represented by the absence of light;
a receiver for receiving a second plurality of pulses from a second preselected direction;
a comparator for comparing said first plurality of pulses to said second plurality of pulses; and
an output signal transmitter for providing an output signal when said first and second pluralities of pulses are equal and said second plurality of pulses comprises said coded pattern.

8. The object detector of claim 7, wherein:
said first plurality of pulses comprises eight pulses, at least one of said eight pulses being a high pulse.

9. The object detector of claim 7, wherein:
said output signal is a logically high signal when said first and second pluralities of pulses comprise the same coded pattern.

10. The object detector of claim 7, wherein:
said output signal is a logically low signal when said first and second pluralities of pulses comprise the same coded pattern.

11. The object detector of claim 7, wherein:
a microprocessor comprises said energy pulse transmitter and said comparator.

12. A object detector, comprising:
an energy pulse transmitter for transmitting a first plurality of pulses in a first preselected direction, said first plurality of pulses comprising a coded pattern of high and low pulses, said first plurality of pulses comprising a series of light pulses, said high pulses being represented by the presence of light and said low pulses being represented by the absence of light;
a receiver for receiving a second plurality of pulses from a second preselected direction;
a comparator for comparing said first plurality of pulses to said second plurality of pulses; and
an output signal transmitter for providing an output signal when said first and second pluralities of pulses are equal and said second plurality of pulses comprises said coded pattern, said first plurality of pulses comprises eight pulses, at least one of said eight pulses being a high pulse, a microprocessor comprising said energy pulse transmitter and said comparator.

13. The object detector of claim 12, wherein:

said output signal is a logically high signal when said first and second pluralities of pulses comprise the same coded pattern.

14. The object detector of claim 12, wherein:

said output signal is a logically low signal when said first and second pluralities of pulses comprise the same coded pattern.

* * * * *